(12) United States Patent
Rezaul Islam et al.

(10) Patent No.: US 6,895,415 B1
(45) Date of Patent: May 17, 2005

(54) SYSTEM AND METHOD FOR CONCURRENT DISTRIBUTED SNAPSHOT MANAGEMENT

(75) Inventors: Shah Mohammed Rezaul Islam, Cary, NC (US); Vikram Harakere Krishnamurthy, Durham, NC (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/376,832

(22) Filed: Aug. 18, 1999

(51) Int. Cl.[7] .............................................. G06F 17/30
(52) U.S. Cl. ...................... 707/204; 707/202; 707/203
(58) Field of Search ................................ 707/200–204; 714/6, 1.21; 711/112, 162

(56) References Cited

U.S. PATENT DOCUMENTS

| | | | | |
|---|---|---|---|---|
| 5,317,731 A | * | 5/1994 | Dias et al. ...................... 707/8 |
| 5,379,398 A | * | 1/1995 | Cohn et al. ................... 711/154 |
| 5,440,735 A | * | 8/1995 | Goldring ........................ 707/8 |
| 5,790,773 A | * | 8/1998 | DeKoning et al. .............. 714/6 |
| 5,857,208 A | * | 1/1999 | Ofek ........................... 707/204 |
| 6,038,639 A | * | 3/2000 | O'Brien et al. .............. 711/114 |
| 6,058,054 A | * | 5/2000 | Islam et al. .................. 365/200 |
| 6,076,148 A | * | 6/2000 | Kedem ........................ 711/162 |
| 6,131,148 A | * | 10/2000 | West et al. .................. 711/162 |
| 6,212,531 B1 | * | 4/2001 | Blea et al. .................. 707/204 |

* cited by examiner

Primary Examiner—Greta Robinson
Assistant Examiner—Debbie M. Le
(74) Attorney, Agent, or Firm—John L. Rogitz (57) ABSTRACT

A computer-implemented method for managing data snapshots among storage volumes to facilitate transitive, distributed snapshot operations such that a read request or write request can be made to any volume in a snapshot includes establishing respective snapshot tables for the volumes. Each table can correlate, for each chunk of data, a source volume and a target volume. In response to a read request for chunks in one the volumes, the respective snapshot table is accessed, and the read directed to the source volume indicated in the snapshot table. Likewise, in response to a write request for chunks in a storage volume, the table associated with the volume is accessed, and the write is directed to the target volume indicated in the table. For each chunk, the source volume is the same across all tables, such that a read or write involves no more than a single storage volume.

9 Claims, 6 Drawing Sheets

FIG. 3
LOGIC

| CHUNK | SOURCE | TARGET |
|-------|--------|--------|
| 1 | C | |
| 2 | C | |
| 3 | C | |
| | | |
| | | |
| | | |
| | | |

C DRIVE

| CHUNK | SOURCE | TARGET |
|-------|--------|--------|
| | D | |
| | D | |
| | D | |
| | | |
| | | |
| | | |
| | | |

D DRIVE

| CHUNK | SOURCE | TARGET |
|-------|--------|--------|
| | E | |
| | E | |
| | E | |
| | | |
| | | |
| | | |
| | | |

E DRIVE

*FIG. 4*
*SNAPSHOT TABLES BEFORE SNAPSHOT*

| CHUNK | SOURCE | TARGET |
|---|---|---|
| | E | |
| | E | |
| | E | |
| | | |
| | | |
| | | |
| | | |

E DRIVE

| CHUNK | SOURCE | TARGET |
|---|---|---|
| 1 | C | |
| 2 | C | |
| 3 | C | |
| | | |
| | | |
| | | |
| | | |

D DRIVE

| CHUNK | SOURCE | TARGET |
|---|---|---|
| 1 | C | D |
| 2 | C | D |
| 3 | C | D |
| | | |
| | | |
| | | |
| | | |

C DRIVE

FIG. 5A
SNAPSHOT TABLES AFTER SNAPSHOT C → D

C DRIVE

| CHUNK | SOURCE | TARGET |
|-------|--------|--------|
| 1 | C | D |
| 2 | C | D |
| 3 | D | |
| | | |
| | | |
| | | |

24

D DRIVE

| CHUNK | SOURCE | TARGET |
|-------|--------|--------|
| 1 | C | |
| 2 | C | |
| 3 | D | C |
| | | |
| | | |
| | | |

26

FIG. 5B
SNAPSHOT TABLES AFTER C → D; D → C
(AFTER WRITING CHUNK #3 IN C)

C DRIVE

| CHUNK | SOURCE | TARGET |
|---|---|---|
| 1 | C | D |
| 2 | C | D |
| 3 | C | D |
| | | |
| | | |
| | | |
| | | |

D DRIVE

| CHUNK | SOURCE | TARGET |
|---|---|---|
| 1 | C | E |
| 2 | C | E |
| 3 | C | E |
| | | |
| | | |
| | | |
| | | |

E DRIVE

| CHUNK | SOURCE | TARGET |
|---|---|---|
| 1 | C | |
| 2 | C | |
| 3 | C | |
| | | |
| | | |
| | | |
| | | |

FIG. 6
SNAPSHOT TABLES AFTER C→D; D→E

| C DRIVE | | |
|---|---|---|
| CHUNK | SOURCE | TARGET |
| 1 | C | D |
| 2 | C | D |
| 3 | C | D |
| | | |
| | | |
| | | |
| | | |

| D DRIVE | | |
|---|---|---|
| CHUNK | SOURCE | TARGET |
| 1 | C | E |
| 2 | C | E |
| 3 | C | E |
| | | |
| | | |
| | | |
| | | |

| E DRIVE | | |
|---|---|---|
| CHUNK | SOURCE | TARGET |
| 1 | C | |
| 2 | C | |
| 3 | C | |
| | | |
| | | |
| | | |
| | | |

FIG. 7

SNAPSHOT TABLES AFTER SNAPSHOT C → D; D → E; E → C

SYSTEM AND METHOD FOR CONCURRENT DISTRIBUTED SNAPSHOT MANAGEMENT

BACKGROUND OF THE INVENTION

1. Field of the Invention

The present invention relates generally to snapshots of data, and more particularly to systems and methods for establishing transitive, distributed snapshots among plural data storage volumes.

2. Description of the Related Art

A snapshot of data at a time "t" creates, in a target data volume, a logical copy of data in a source data volume. Physical copying of the data from the source volume to the target volume can then subsequently take place, with any intervening changes ("writes") to data in the source volume being momentarily delayed while the original version of the data sought to be changed is preferentially copied from the source volume to the target volume, prior to writing the change. Thus, the snapshot of data in the target volume represents the exact state of the data in the source volume at the time "t".

Snapshots as defined above are useful for backing up data and for testing. For example, taking a snapshot of frequently changing data facilitates the execution of Y2K test applications against the snapshot of the data, without the test application execution being unduly interfered with by changes to the data. Moreover, the snapshot mechanism facilitates faster data backups by a storage subsystem as compared to file system-based backups, which entail host CPU processing and which require the allocation of relatively high network bandwidth.

As recognized herein, existing snapshot systems are unduly restrictive. Most, for instance, permit write access only to the source volume in order to coordinate data in the system. Further, the limitations of existing snapshot systems prohibit the undertaking of concurrent snapshots or of distributed snapshots, and they do not support cyclical and transitive snapshot operations. As understood herein, concurrent snapshots, distributed snapshots, and cyclical and transitive snapshot operations can be very useful for test purposes. Moreover, because existing systems fail to account for the above-recognized considerations, the cost of reads and writes in existing snapshot systems in the case of multiple storage volumes that are involved in multiple concurrent snapshot operations is not optimized.

The present invention has carefully considered the above problems and has provided the solution set forth herein.

SUMMARY OF THE INVENTION

A computer-implemented method is disclosed for managing data snapshots among first and second storage volumes. The method includes invoking a snapshot relationship between the volumes, and in response thereto establishing a logical copy of data from the first storage volume on the second storage volume. The method further includes establishing respective first and second snapshot tables for the volumes. In accordance with the present invention, each table includes a source volume column and a target volume column. Then, in response to a read request for one or more chunks in one of the volumes, the snapshot table associated with the volume is accessed to direct the read to the source volume indicated for the requested chunks in the snapshot table. Similarly, in response to a write request for one or more chunks in one of the volumes, the table associated with the volume is accessed and the write is directed to the target volume indicated for the requested chunks in the table.

In a preferred embodiment, the chunks are of equal size with each other, though the magnitude of the size can be arbitrarily selected. Moreover, for each chunk, the source volume is the same across all tables, such that a read involves no more than a single storage volume. As set forth in detail below, entries are changed in the tables in response to physical copying of data between the volumes as a result of a snapshot invocation.

In another aspect, a computer system includes a plurality of storage volumes, and a snapshot module that invokes at least one snapshot relationship between the volumes such that a read or write request can be made to any volume in the relationship. The invention supports multiple concurrent snapshots and cyclic snapshot operations.

In still another aspect, a computer program product includes a computer program storage device, and computer-readable instructions on the storage device for causing a computer to undertake method acts to facilitate transitive, distributed snapshot operations. The method acts embodied by the instructions include establishing a snapshot relationship wherein data chunks on a source volume are to be logically mirrored on a target volume. For each volume, an associated table is established that can list, for each chunk, a source volume and a target volume. Then, subsequent I/O requests are permitted to either the source or target volume. In response to the I/O events, the table of the source or target volume is accessed to direct the I/O event according to one or more entries in the table.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
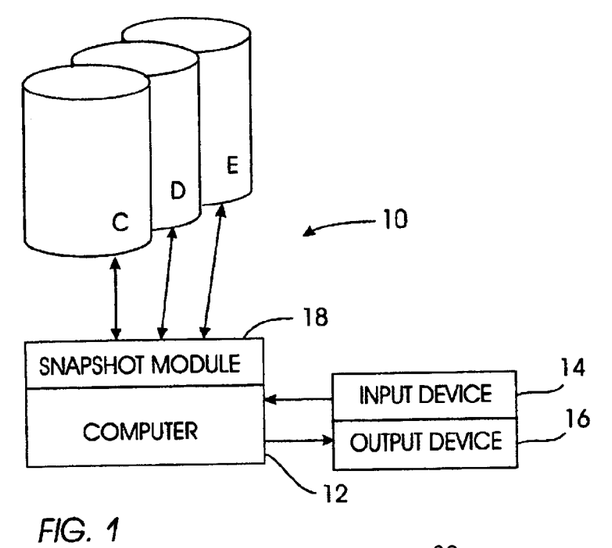
FIG. 1 is a block diagram of the architecture of the present system.

Referring initially to FIG. 1, a system is shown, generally designated 10, for invoking and executing transitive distributed snapshot relationships between plural data storage volumes C, D, and E, such that a read or write can be made to any storage volume. As shown, the system 10 can include a computer 12 including a respective input device 14 such as a keyboard with, e.g., a point and click device, and an output device 16, such as a monitor, printer, other computer, or computer network. Also, the computer 12 accesses a software-implemented snapshot module 18 for undertaking the inventive steps herein.

The computer 12 can be a personal computer made by International Business Machines Corporation (IBM) of Armonk, N.Y. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as data storage devices.

Figure 2:
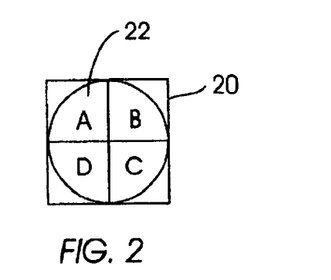
FIG. 2 is a schematic diagram of a computer program product.

In any case, the processor of the computer 12 accesses the snapshot module 18 to undertake the logic of the present invention, which may be executed by a processor as a series of computer-executable instructions. The instructions may be contained on a data storage device with a computer readable medium, such as a computer diskette 20 shown in FIG. 2 having a computer usable medium 22 with code elements A–D stored thereon. Or, the instructions may be stored on random access memory (RAM) of the computer 12, on a DASD array, or on magnetic tape, conventional hard disk drive, electronic read-only memory, optical storage device, or other appropriate data storage device. In an illustrative embodiment of the invention, the computer-executable instructions may be lines of C++ code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 3:
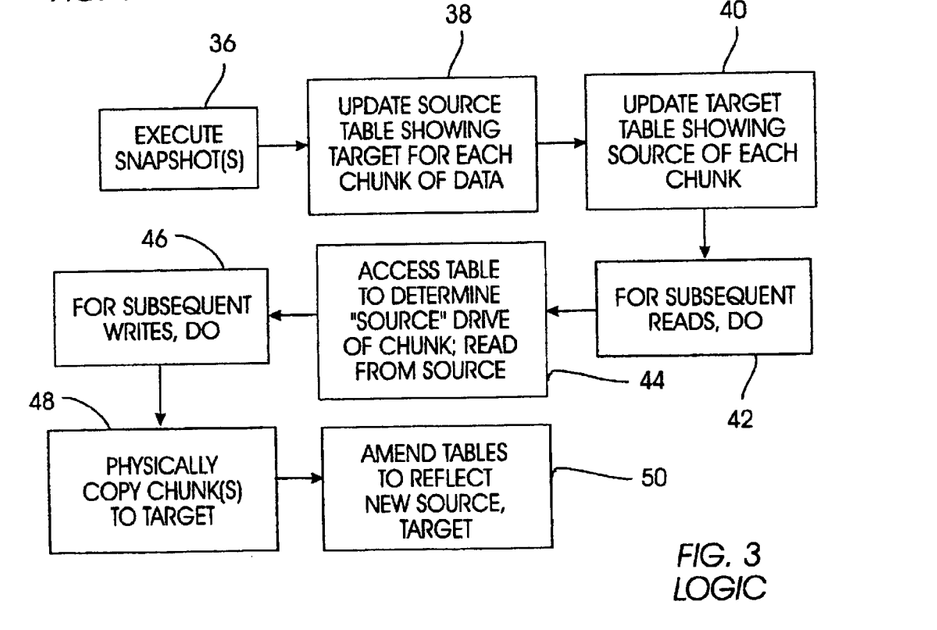
FIG. 3 is a flow chart of the snapshot logic.
Figure 4:
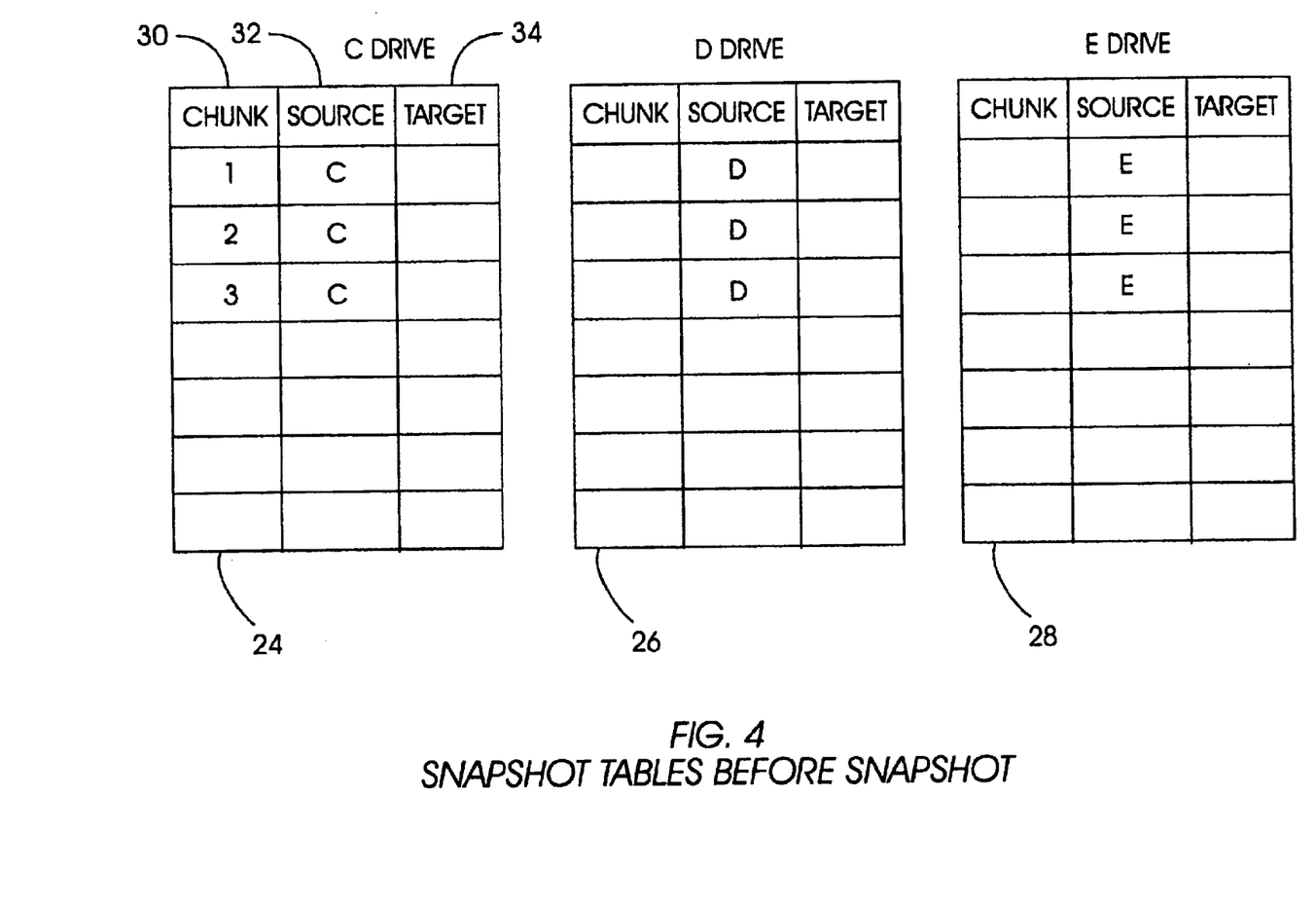
FIG. 4 is a schematic representation of snapshot tables before a first snapshot.

Now referring to FIGS. 3–7, the logic of the present invention can be seen. FIG. 4 shows snapshot tables 24, 26, 28 labelled "C drive", "D drive", and "E drive" prior to the invocation of any snapshot relationships, it being understood that the snapshot tables 24, 26, 28 are respectively provided for the storage volumes C, D, and E shown in FIG. 1. As shown, taking the C drive table 24 as an example, each table 24, 26, 28 has a respective chunk column 30 for listing one or more data chunks, e.g., of block size. In the present example, only chunks 1–3 are listed in FIG. 4 for the C drive table 24 for clarity of disclosure. Also, each table 24, 26, 28 has a respective source volume column 32. As shown, the source column 32 for the C drive table 24 prior to the invocation of any snapshots lists the source volume for all chunks as being the C volume shown in FIG. 1. Moreover, each table 24, 26, 28 has a respective target volume column 34. As shown, the target column 34 for the C drive table 24 prior to the invocation of any snapshots lists no target volumes for the chunks, because no snapshots have been invoked. Likewise, the D drive table 26 and E drive table 28 lists their own associated storages volumes as the sources for data chunks listed in the tables 26, 28.

Figure 5A:
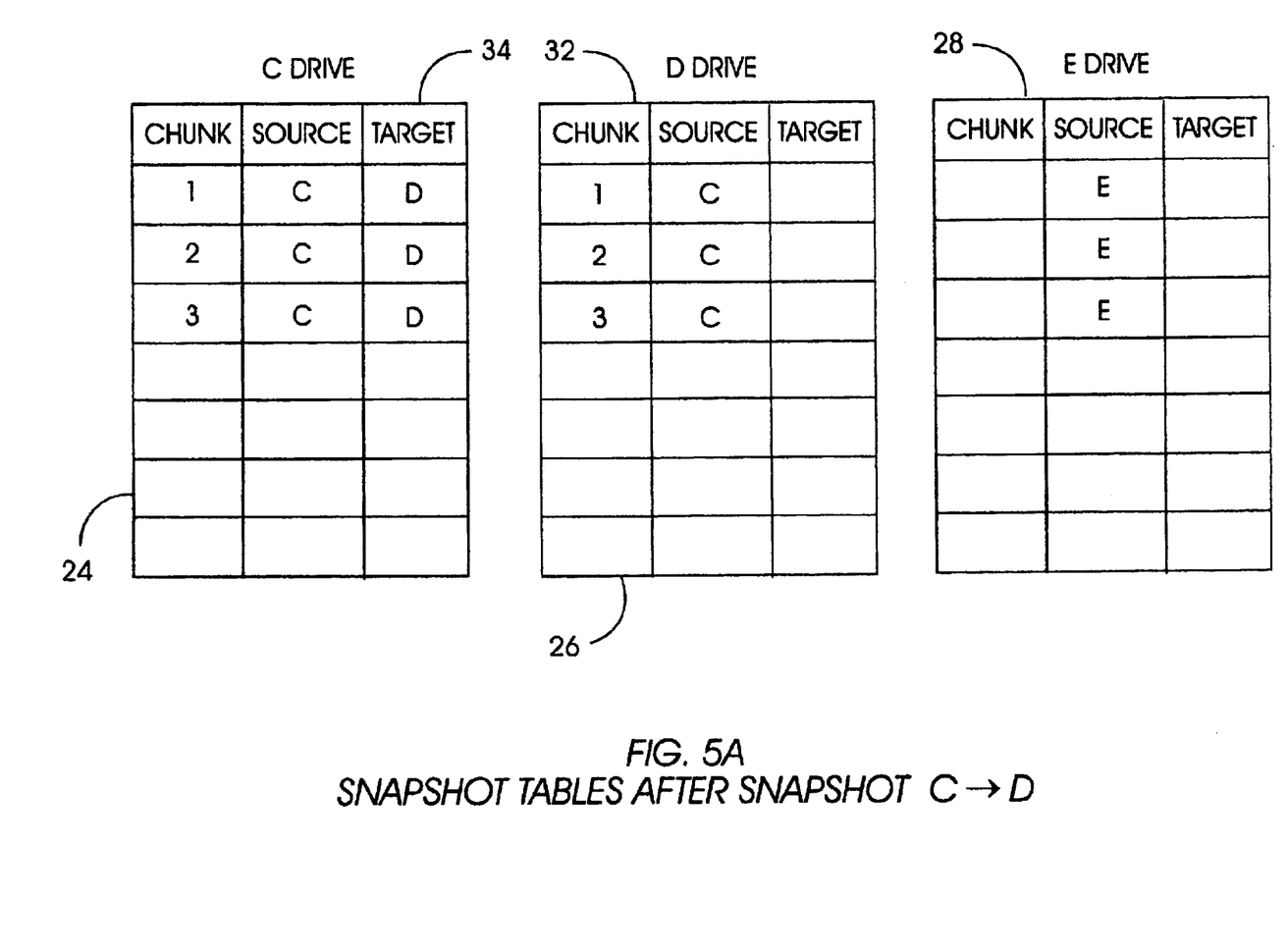
FIG. 5A is a schematic representation of snapshot tables after a snapshot relationship from the C volume to the D volume has been established.

Having thus explained the preferred snapshot table format, reference is now made to FIGS. 3 and 5A. At block 36 in FIG. 3, a snapshot relationship is invoked for execution. In the present illustration, assume that a user has input a command to cause a snapshot of chunks 1–3 on the C volume onto the D volume. Under these circumstances, the C volume is the source volume (and the C drive table 34 the source table), whereas the D volume is the target volume (and the D drive table 36 the target table).

FIG. 5A shows the resulting snapshot tables 24, 26. As indicated at block 38 of FIG. 3 and as shown in FIG. 5A, the target column 34 of the C drive table 24 (the source table) has been altered to list the D volume as the target volume for the chunks 1–3. Also, the source column 32 of the D drive table 26 (the target table) lists the C volume as being the source volume for the chunks 1–3, as indicated at block 40 of FIG. 3.

With the above in mind, both reads and writes can be executed against either of the source or target volumes involved in a snapshot relationship. More particularly, for each read to a volume the logic enters a DO loop at block 42 in FIG. 3, and then proceeds to block 44 to access the table of the requested volume to determine the source volume for the chunk or chunks for which a read has been requested. Because, for each chunk 1–3, the source volume that is indicated is the same across all tables 24, 26 that are in a snapshot relationship, the source volume will always be read, regardless of the volume to which the request has been made.

Accordingly, when a request is made to the C volume to read, e.g., chunk #2, the C drive table 24 is accessed and the source column examined to determine that the source of the requested chunk is in fact the C volume. The read request is then satisfied from the C volume. In contrast, when a request is made to the D volume to read, e.g., chunk #2, the D drive table 26 is accessed and the source column examined to determine that the source of the requested chunk is in fact the C volume. The read request is then redirected such that chunk #2 is read from the C volume.

When a write request is received, a DO loop is entered at block 46 of FIG. 3, wherein the logic moves to block 48 to physically copy the requested chunk to the target volume as indicated in the target column 34 of the source table, prior to writing a new version of thew chunk. Then, at block 50, the respective tables are amended as appropriate. To illustrate, assume that a write request to chunk #3 has been received, and that in response chunk #3 is physically copied from the C volume to the D volume prior to modification in the C volume. Then, the write can be executed against chunk #3 in the C volume. In the meantime, the source columns 34 of the source table (i.e., the C drive table 24) and target table (i.e., the D drive table 36) are changed to indicate that the snapshot source for chunk #3 is the D volume.

Figure 5B:
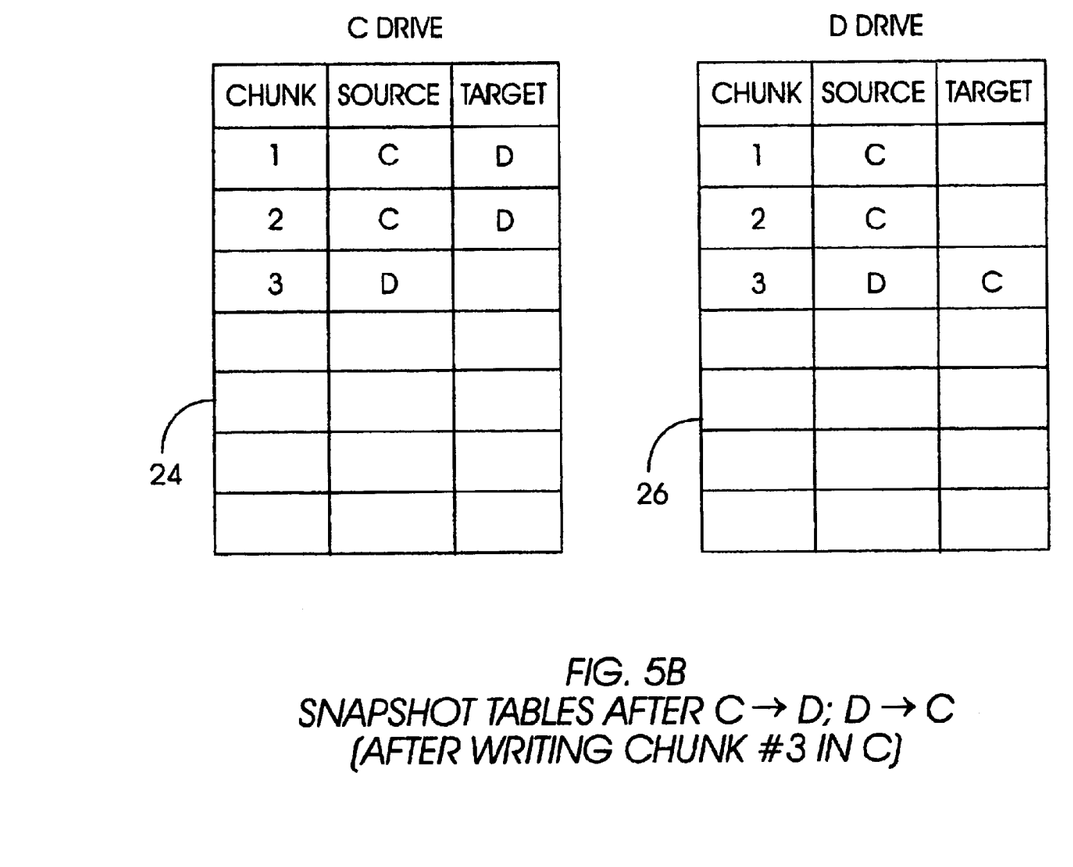
FIG. 5B is a schematic representation of snapshot tables after a snapshot relationship from the D volume to the C volume has been established subsequent to the snapshot shown in FIG. 5A.

Further assume that after the snapshot of C to D, it is desired to snapshot D back onto C at a later time, after the above-described write operation. FIG. 5B shows the states of the snapshot tables 24, 26 after such an event. As shown, the source volume for chunk nos. 1 and 2 is indicated to be the C volume in both the C drive table 24 and D drive table 26, whereas the source for chunk #3 is indicated as being the D volume in both tables 24, 26. In contrast, in the C drive table 24 the target volume for chunks 1 and 2 is indicated as being the D volume, and no target volume for chunk #3 is indicated in the target column 34 of the C drive table 24. In the D drive table 26, on the other hand, no target volume is indicated for chunks 1 and 2, whereas the C volume is indicated as being the target volume for chunk #3. In other words, in the target column 34 of a snapshot table, when the corresponding volume is the target volume of a chunk, a null entry is made for that chunk.

Figure 6:
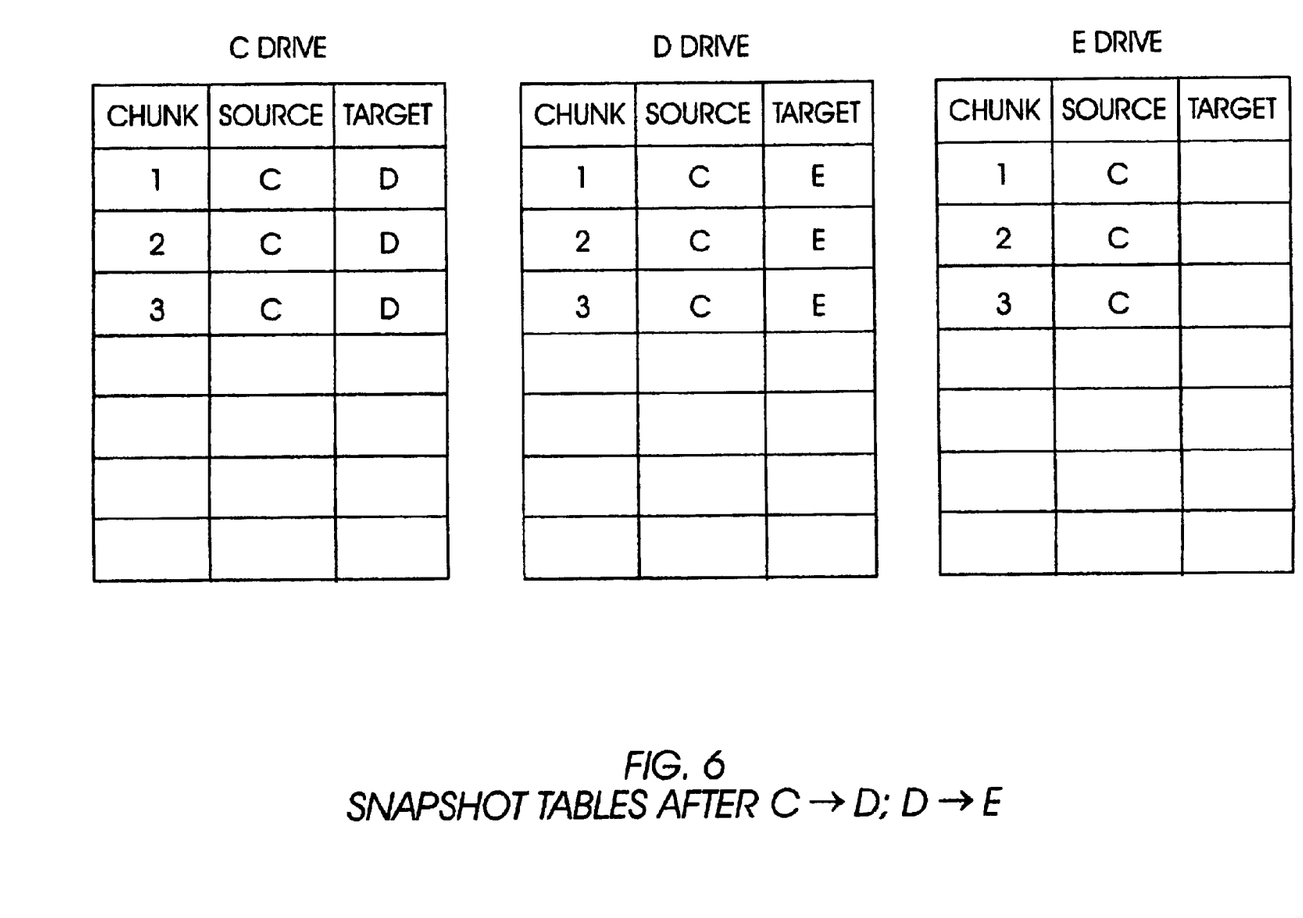
FIG. 6 is a schematic representation of snapshot tables after a snapshot relationship from the D volume to the E volume has been established subsequent to the snapshot shown in FIG. 5A.
Figure 7:
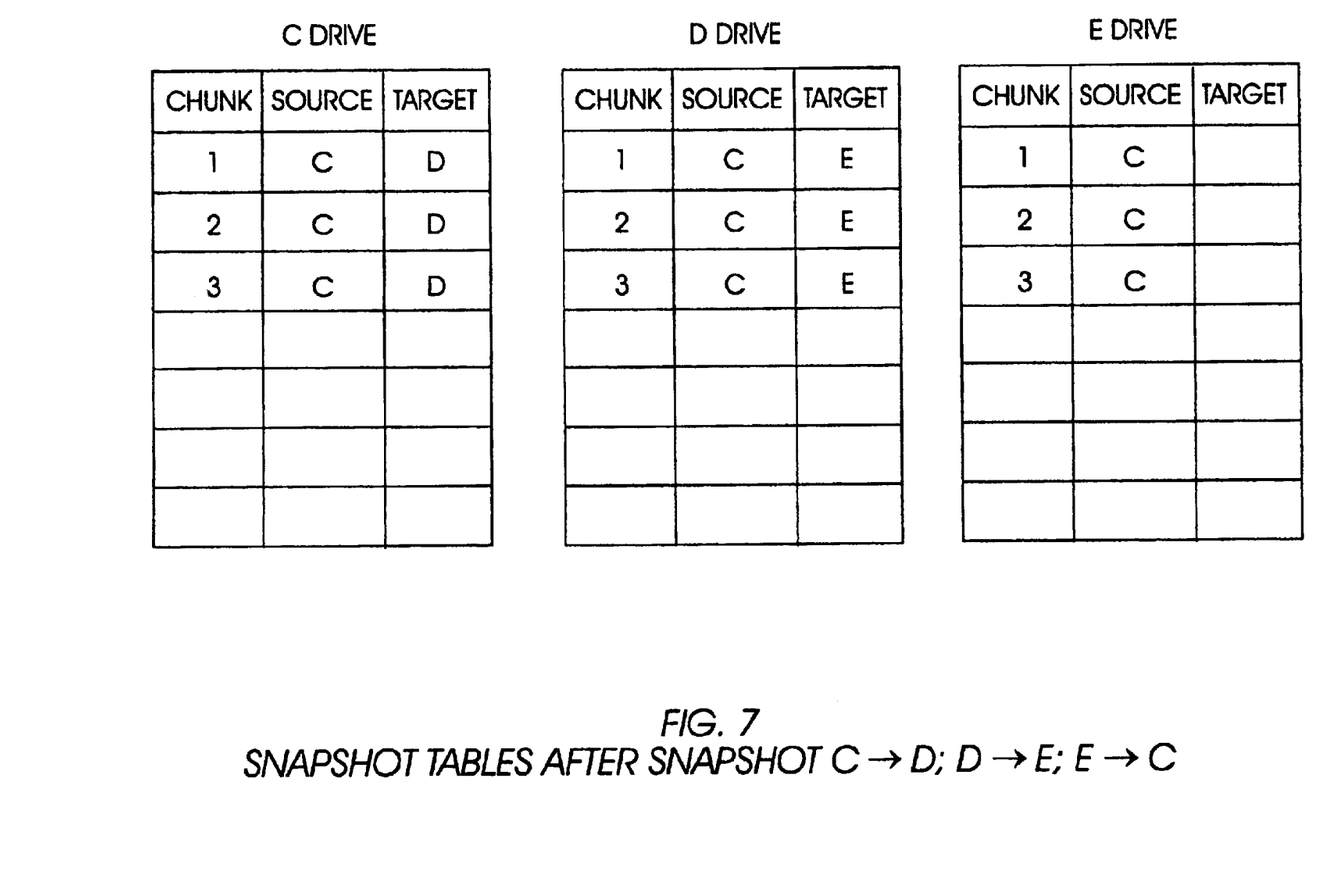
FIG. 7 is a schematic representation of snapshot tables after a snapshot relationship from the E volume to the C volume has been established subsequent to the snapshot shown in FIG. 6.

FIGS. 6 and 7 illustrate further snapshot operations in accordance with the present invention. Recall that FIG. 5A showed the results of a snapshot from the C volume to the D volume. FIG. 6 shows the results of a subsequent snapshot from the D volume to the E volume, and FIG. 7 shows the results of a still subsequent snapshot from the E volume back to the C volume. Note that, in FIG. 7, the target fields in the E table 26 fields are NULL, whereas the source fields in all three tables 24, 26, 28 indicate that the source of chunks 1–3 is the C volume. As intended by the present invention, a NULL field nevertheless indicates or correlates a target volume to a corresponding chunk, in the the NULL field simply indicates, in a negative way, a target volume.

Mathematically, the above snapshot operations can be expressed as:

Source $[t][j]$=Source $[s][j]$, for all chunks j in a source volume s that are snapshot to a target volume t; and var r=s;

while (Target$[r][j]$!=NULL) r=Target$[r][j]$;

Target $[r][j]$=t,

The table modifications following the above-disclosed physical copying due to a write access can be expressed as:

Source $[t][j]$=t; and var r=s;

while (Target$[r][j]$!=t) r=Target$[r][j]$;

Target $[r][j]$=Target$[t][j]$

While the particular SYSTEM AND METHOD FOR CONCURRENT DISTRIBUTED SNAPSHOT MANAGEMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or "steps for".

We claim:

1. A computer-implemented method for managing data snapshots among at least first and second storage volumes, comprising:

invoking a snapshot relationship between the volumes;

in response to the invoking act, establishing a logical copy of data from the first storage volume on the second storage volume;

establishing respective first and second snapshot tables for the volumes, each table including a source volume column and a target volume column;

in response to a read request for one or more read chunks in a "read" one of the volumes, accessing the snapshot table associated with the "read" volume, either one of the first and second storage volumes being selectable as the read volume;

directing the read to the source volume as indicated for the read chunks in the source column of the snapshot table associated with the "read" volume;

in response to a write request for one or more write chunks in a "write" one of the volumes, accessing the table associated with the "write" volume, either one of the first and second storage volumes being selectable as the write volume; and directing the write to the target volume as indicated for the write chunks in the target column of the table associated with the "write" volume.

2. The method of claim 1, wherein the chunks are of equal size with each other.

3. The method of claim 1, wherein for each chunk, the source volume is the same across all tables, such that a at least one of: a read, or a write, involves no more than a single storage volume.

4. The method of claim 3, further comprising at least a third storage volume with associated third snapshot table.

5. A computer program product, comprising:

a computer program storage device;

computer-readable instructions on the storage device for causing a computer to undertake method acts to facilitate transitive, distributed snapshot operations, the method acts comprising:

establishing a snapshot relationship wherein data chunks on a source volume are to be logically mirrored on a target volume;

for each volume, establishing an associated table that can list, for each chunk, a source volume and a target volume;

permitting subsequent I/O requests to either the source or target volume; and in response to the I/O events, accessing the table of the source or target volume and directing the I/O event according to one or more entries therein.

6. The computer program product of claim 5, wherein the method acts embodied by the instructions include:

in response to the act of establishing a snapshot relationship, establishing a logical copy of data from the source volume on the target volume;

in response to a read request for one or more read chunks in a "read" one of the volumes, accessing the snapshot table associated with the "read" volume;

directing the read to the source volume indicated for the read chunks in the snapshot table associated with the "read" volume;

in response to a write request for one or more write chunks in a "write" one of the volumes, accessing the table associated with the "write" volume; and directing the write to the target volume indicated for the write chunks in the table associated with the "write" volume.

7. The computer program product of claim 6, wherein the chunks are of equal size with each other.

8. The computer program product of claim 6, wherein for each chunk, the source volume is the same across all tables, such that a at least one of: a read, or a write, involves no more than a single storage volume.

9. The computer program product of claim 8, wherein the method steps embodied by the instructions include changing entries in the tables in response to physical copying of data between the volumes as a result of a snapshot invocation.

* * * * *